United States Patent
Chakravarty et al.

(10) Patent No.: US 9,248,837 B2
(45) Date of Patent: Feb. 2, 2016

(54) METHOD AND SYSTEM FOR CONTROLLING A SPEED OF A VEHICLE

(71) Applicant: Tata Consultancy Services Limited, Maharashtra (IN)

(72) Inventors: Tapas Chakravarty, Kolkata (IN); Arijit Chowdhury, Kolkata (IN); Balamuralidhar Purushothaman, Bangalore (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 0 days.

(21) Appl. No.: 14/619,462

(22) Filed: Feb. 11, 2015

(65) Prior Publication Data

US 2015/0258993 A1     Sep. 17, 2015

(30) Foreign Application Priority Data

Mar. 11, 2014    (IN) ............................ 817/MUM/2014

(51) Int. Cl.
    *B60W 30/14*       (2006.01)
    *B60W 30/20*       (2006.01)

(52) U.S. Cl.
    CPC ............ *B60W 30/143* (2013.01); *B60W 30/20* (2013.01); *B60W 2520/105* (2013.01); *B60W 2550/147* (2013.01); *B60W 2550/402* (2013.01); *B60W 2720/10* (2013.01)

(58) Field of Classification Search
    USPC .......................................................... 701/93
    See application file for complete search history.

(56) References Cited

U.S. PATENT DOCUMENTS

| | | | |
|---|---|---|---|
| 4,821,828 A * | 4/1989 | Schwerzler | ............. F16F 7/108 180/300 |
| 6,202,020 B1 | 3/2001 | Kyrtsos | |
| 7,168,709 B2 | 1/2007 | Niwa et al. | |
| 8,155,868 B1 * | 4/2012 | Xing | .................... G07C 5/0808 340/439 |
| 2008/0251307 A1 | 10/2008 | Bell et al. | |
| 2011/0248846 A1 * | 10/2011 | Belov | ....................... H04Q 9/00 340/539.1 |
| 2011/0307165 A1 * | 12/2011 | Hiestermann | .......... G01C 21/32 701/119 |
| 2012/0192833 A1 * | 8/2012 | Hagari | .................. F02D 35/027 123/406.35 |
| 2013/0041552 A1 * | 2/2013 | MacNeille | ......... G01C 21/3469 701/32.9 |

(Continued)

FOREIGN PATENT DOCUMENTS

WO     WO/2013/004764     1/2013

OTHER PUBLICATIONS

David Stavens et al ; Stanford Artificial Intelligence Laboratory, "Online Speed Adaptation using Supervised Learning for High-Speed, Off-Road Autonomous Driving"Jan. 6, 2007.

*Primary Examiner* — Shelley Chen
(74) *Attorney, Agent, or Firm* — Thompson Hine LLP

(57) ABSTRACT

A method and system for controlling a speed of a vehicle. Acceleration data comprising acceleration samples of the vehicle on a segment of the road is captured. Jerk energy values associated with the vehicle on the segment is computed based upon the acceleration samples. Median jerk energy of the vehicle on the segment may be determined based upon the jerk energy values. Predictive median jerk energy of the vehicle on the segment is computed using a statistical equation. A score associated with the segment is calculated based upon the median jerk energy, the predictive median jerk energy, and a standard deviation ($\sigma$). The segment is classified into one of a first set of categories and a second set of categories based upon the score. A feedback signal indicative of controlling the speed of the vehicle is transmitted to a controller based upon the classification.

10 Claims, 5 Drawing Sheets

(56) References Cited

U.S. PATENT DOCUMENTS

| | | | | |
|---|---|---|---|---|
| 2013/0041623 A1* | 2/2013 | Kumar | ................... | G01C 21/14 702/158 |
| 2013/0233083 A1* | 9/2013 | Hofelsauer | .............. | G01H 1/00 73/649 |
| 2014/0229043 A1* | 8/2014 | Frank | .................... | B60W 20/20 701/22 |

* cited by examiner

METHOD AND SYSTEM FOR CONTROLLING A SPEED OF A VEHICLE

CROSS-REFERENCE TO RELATED APPLICATIONS AND PRIORITY

The present application does claim priority from an Indian patent application no. 817/MUM/2014 filed on 11 Mar., 2014, the entirety of which is hereby incorporated by reference herein.

TECHNICAL FIELD

The present disclosure described herein, in general, relates to methods and systems for controlling a speed of a vehicle, and more particularly to systems and methods for controlling the speed of the vehicle based upon roughness of the road.

BACKGROUND

Autonomous vehicles have been introduced in recent times that facilitate driving of a vehicle without the assistance of a driver present in the vehicle. A controller present in such an autonomous vehicle may be configured to drive the vehicle at a particular speed on a road. However, there are challenges when the conditions on the road are variable and contain patches of segments having roughness conditions. In such scenarios, the speed of the vehicle may be required to be controlled by the controller depending on the variance of the road conditions in the patches of segments.

Efforts have been made in the past in order to sense vibrations caused to the vehicle and accordingly set the speed of the vehicle to a predefined threshold value in order to avoid jerk to the vehicle. However, such configuration of the speed the vehicle may not be useful since not all segments of the road may have roughness conditions or smooth conditions. Further, setting the speed of the vehicle to the predefined threshold value may create a challenge in ensuring safety to passengers inside the vehicle, as roughness of the road may vary from one segment to the other, and hence the speed may have to be reduced in order to avoid havoc or damage to the passengers.

SUMMARY

This summary is provided to introduce aspects related to systems and methods for controlling a speed of a vehicle and the aspects are further described below in the detailed description. This summary is not intended to identify essential features of the claimed disclosure nor is it intended for use in determining or limiting the scope of the claimed disclosure.

In one implementation, a method for controlling a speed of a vehicle on a road is disclosed. The method may comprise capturing, in real time, acceleration data of the vehicle on the road divided into a plurality of segments. The acceleration data may comprise acceleration samples captured on a segment of the road. The method may further comprise computing jerk energy values associated with the vehicle on the segment based upon the acceleration samples. The method may further comprise determining median jerk energy of the vehicle on the segment based upon the jerk energy values. The method may further comprise computing predictive median jerk energy of the vehicle on the segment using a statistical equation. The method may further comprise calculating a score associated with the segment based upon the median jerk energy, the predictive median jerk energy, and a standard deviation ($\sigma$). The method may further comprise classifying the segment into one of a first set of categories and a second set of categories based upon the score. The method may further comprise transmitting a feedback signal to a controller of the vehicle. The feedback signal is indicative of one of reducing, increasing, or retaining the speed of the vehicle on the segment of the road based upon the classification of the segment. In one embodiment, the capturing, the computing the jerk energy values, the determining, the computing the predictive median jerk energy, the calculating, the classifying, and the transmitting are performed by a processor using a set of instructions stored in a memory.

In another implementation, a system for controlling a speed of a vehicle on a road is disclosed. The system may comprise a processor and a memory coupled to the processor configured for executing a plurality of modules stored in the memory. The plurality of modules may comprise a jerk computation module and a speed control module. The jerk computation module may be configured to capture, in real time, acceleration data of the vehicle on the road divided into a plurality of segments. The acceleration data may comprise acceleration samples captured on a segment of the road. The jerk computation module may be further configured to compute jerk energy values associated with the vehicle on the segment based upon the acceleration samples. The jerk computation module may be further configured to determine median jerk energy of the vehicle on the segment based upon the jerk energy values. The speed control module may be configured to compute predictive median jerk energy of the vehicle on the segment using a statistical equation. The speed control module may be further configured to calculate a score associated with the segment based upon the median jerk energy, the predictive median jerk energy, and a standard deviation ($\sigma$). The speed control module may be further configured to classify the segment into one of a first set of categories and a second set of categories based upon the score. The speed control module may be further configured to transmit a feedback signal to a controller of the vehicle. The feedback signal is indicative of one of reducing, increasing, or retaining the speed of the vehicle on the segment of the road based upon the classification of the segment.

In yet another implementation, a non-transitory computer readable medium having embodied thereon a computer program comprising a set of instructions for controlling a speed of a vehicle on a road is disclosed. The computer program may comprise an instruction for capturing, in real time, acceleration data of the vehicle on the road divided into a plurality of segments. The acceleration data may comprise acceleration samples captured on a segment of the road. The computer program may further comprise an instruction for computing jerk energy values associated with the vehicle on the segment based upon the acceleration samples. The computer program may further comprise an instruction for determining median jerk energy of the vehicle on the segment based upon the jerk energy values. The computer program may further comprise an instruction for computing predictive median jerk energy of the vehicle on the segment using a statistical equation. The computer program may further comprise an instruction for calculating a score associated with the segment based upon the median jerk energy, the predictive median jerk energy, and a standard deviation ($\sigma$). The computer program may further comprise an instruction for classifying the segment into one of a first set of categories and a second set of categories based upon the score. The computer program may further comprise an instruction for transmitting a feedback signal to a controller of the vehicle. The feedback signal is indicative of one of reducing, increasing, or retaining the speed of the vehicle on the segment of the road based upon the classification of the segment.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer to like features and components.

DETAILED DESCRIPTION

Systems and methods for controlling a speed of a vehicle on a road are described. The road may be divided into microtrips, also interchangeably referred to hereinafter as "segments." During movement of the vehicle on the road, acceleration samples of the vehicle on each segment may be captured in real time. The acceleration samples may be processed in order to compute jerk energy values associated with the vehicle on each segment. The jerk energy values may be used in order to determine the median jerk energy of the vehicle on each segment. Further, a predictive median jerk energy of the vehicle on each segment may be computed using a statistical equation.

The statistical equation may represent the relationship between a reference average speed of the vehicle and a reference median jerk energy of the vehicle corresponding to each reference segment on a reference track/road. The statistical equation may be derived based upon the reference average speed, the reference median jerk energy, and a standard deviation ($\sigma$). The statistical equation may be indicative of roughness condition of each reference segment on the reference track/road.

Subsequent to the determination of the predictive median jerk energy, a score associated to each segment may be calculated. The score may be calculated based upon the median jerk energy, the predictive median jerk energy, and the standard deviation ($\sigma$). Based upon the score, each segment may be classified into one of a first set of categories and a second set of categories. Further, based upon the classification of a current segment or one or more segments preceding the current segment, a feedback signal indicative of one of reducing, increasing, or retaining current speed of the vehicle may be transmitted to a controller of the vehicle, thereby controlling the speed of the vehicle.

While aspects of described system and method for controlling a speed of a vehicle on a road may be implemented in any number of different computing systems, environments, and/or configurations, the embodiments are described in the context of the following exemplary system.

Figure 1:
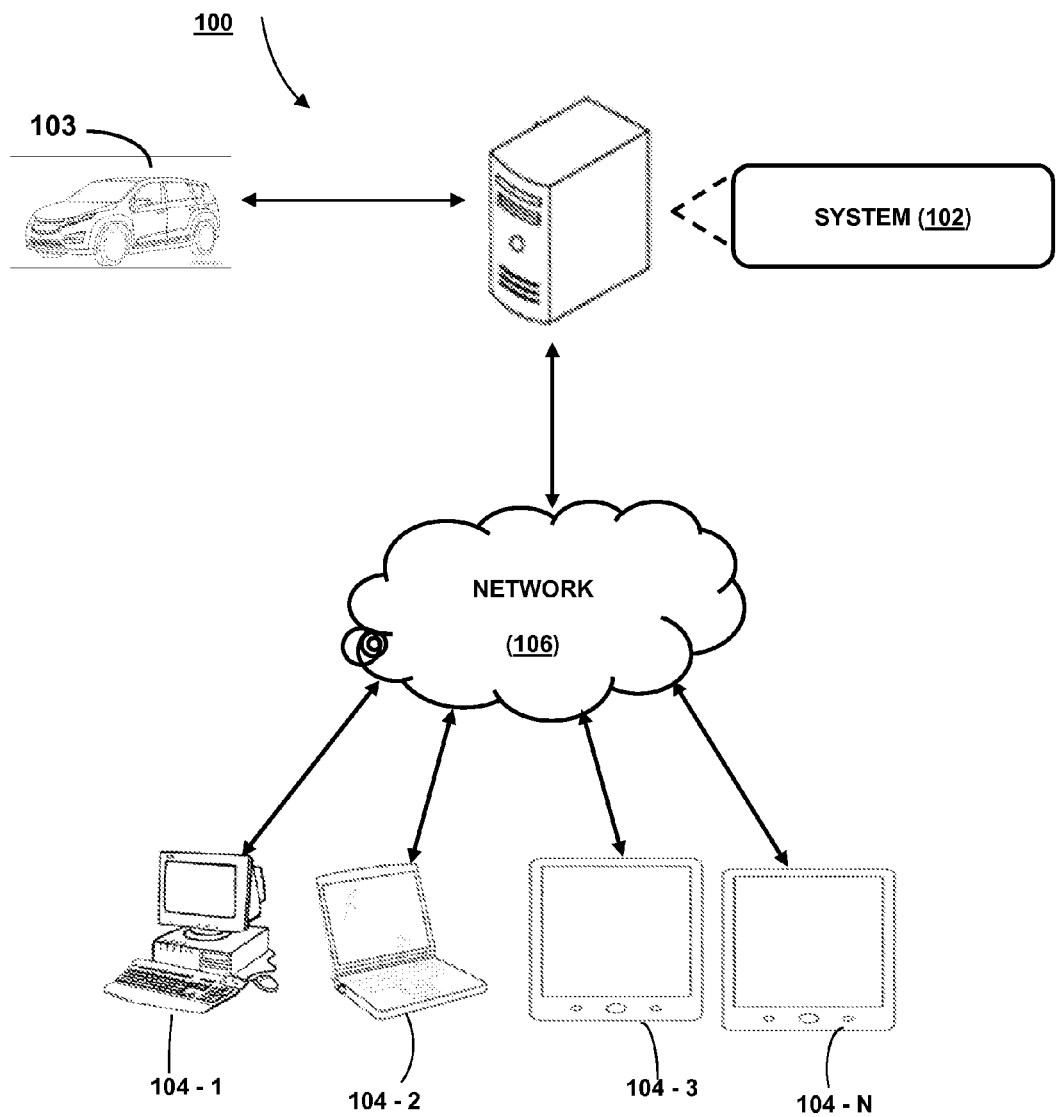
FIG. 1 illustrates a network implementation of a system for controlling a speed of a vehicle on a road, in accordance with an embodiment of the present disclosure.

Referring now to FIG. 1, a network implementation 100 of a system 102 for controlling a speed of a vehicle on a road is illustrated, in accordance with an embodiment of the present disclosure. In one embodiment, the system 102 may be configured to capture, in real time, acceleration data of the vehicle on the road divided into a plurality of segments. The acceleration data may include acceleration samples captured on a segment of the road. The system 102 may be further configured to compute jerk energy values associated with the vehicle on the segment based upon the acceleration samples. The system 102 may be further configured to determine the median jerk energy of the vehicle on the segment based upon the jerk energy values. The system 102 may be further configured to compute the predictive median jerk energy of the vehicle on the segment using a statistical equation. The system 102 may be further configured to calculate a score associated with the segment based upon the median jerk energy, the predictive median jerk energy, and a standard deviation ($\sigma$). The system 102 may be further configured to classify the segment into one of a first set of categories and a second set of categories based upon the score. The system 102 may be further configured to transmit a feedback signal to a controller of the vehicle. The feedback signal is indicative of one of reducing, increasing, or retaining the speed of the vehicle on the segment of the road based upon the classification of the segment.

Although the present disclosure is explained considering that the system 102 is implemented as a server, it may be understood that the system 102 may also be implemented in a variety of computing systems, such as a laptop computer, a desktop computer, a notebook, a workstation, a mainframe computer, a network server, and the like. In one implementation, the system 102 may be implemented in a cloud-based environment. It will be understood that the system 102 may be accessed by multiple users through one or more user devices 104-1, 104-2, 104-3, . . . , 104-N, collectively also referred to as a user device 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106. Further, the system 102 may be coupled with a vehicle 103 as shown in FIG. 1. The vehicle 103 may be capable of transmitting real time analytics data captured from on-board telematics devices on the vehicle 103.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
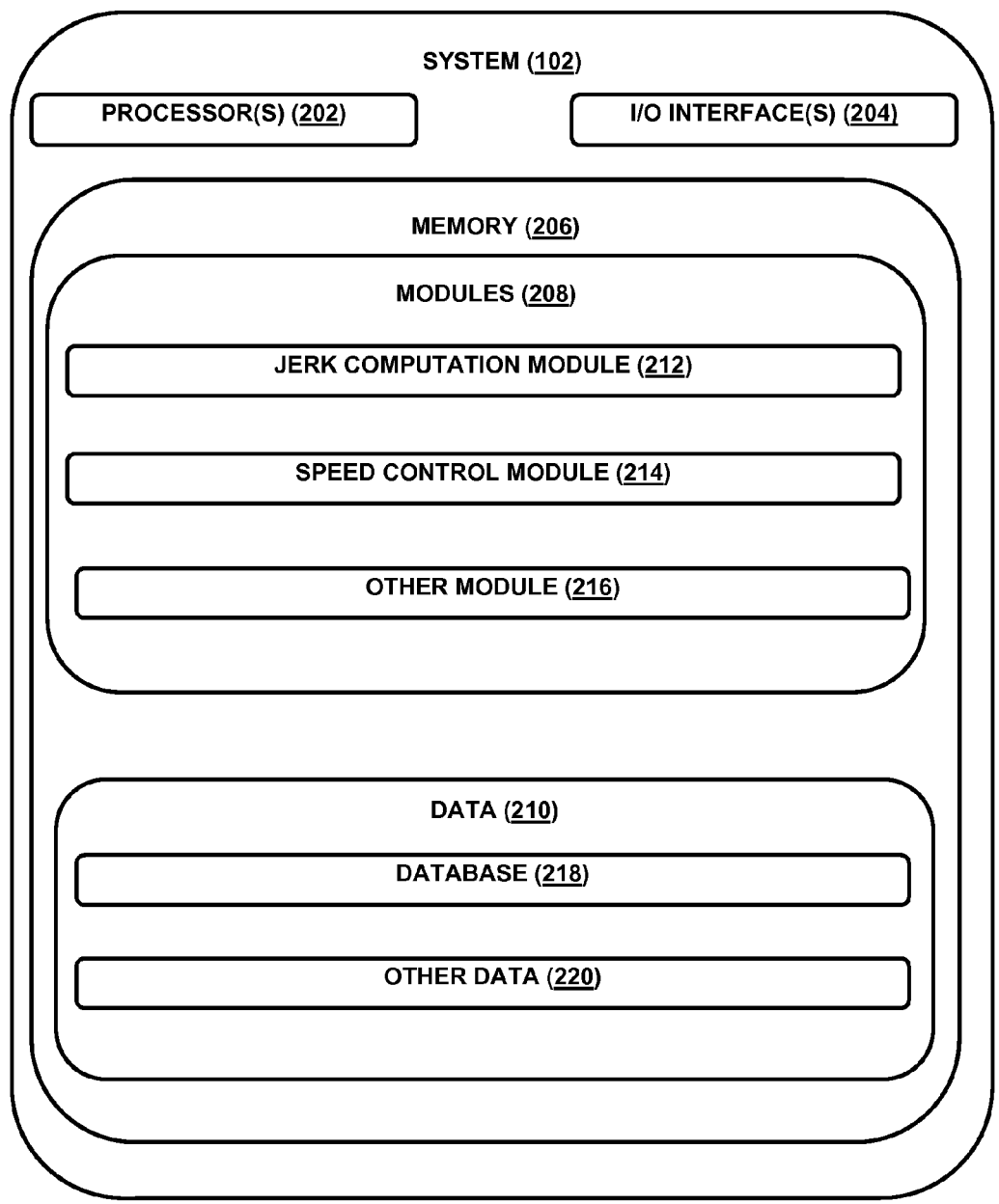
FIG. 2 illustrates the system, in accordance with an embodiment of the present disclosure.

Referring now to FIG. 2, the system 102 is illustrated in accordance with an embodiment of the present disclosure. In one embodiment, the system 102 may include a processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user device 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a jerk computation module 212, a speed control module 214, and other module 216. The other module 216 may include programs or coded instructions that supplement applications and functions of the system 102.

The data 210, amongst other things, serves as a repository for storing data processed, received, and generated by one or more of the modules 208. The data 210 may also include a database 218 and other data 220. The other data 220 may include data generated as a result of the execution of one or more modules in the other module 216.

In one implementation, at first, a user may use the user device 104 to access the system 102 via the I/O interface 204. The user may register themselves using the I/O interface 204 in order to use the system 102. The working of the system 102 using the plurality of modules 208 is explained in detail referring to FIGS. 3-5 as explained below.

Jerk Computation Module 212

Figure 3:
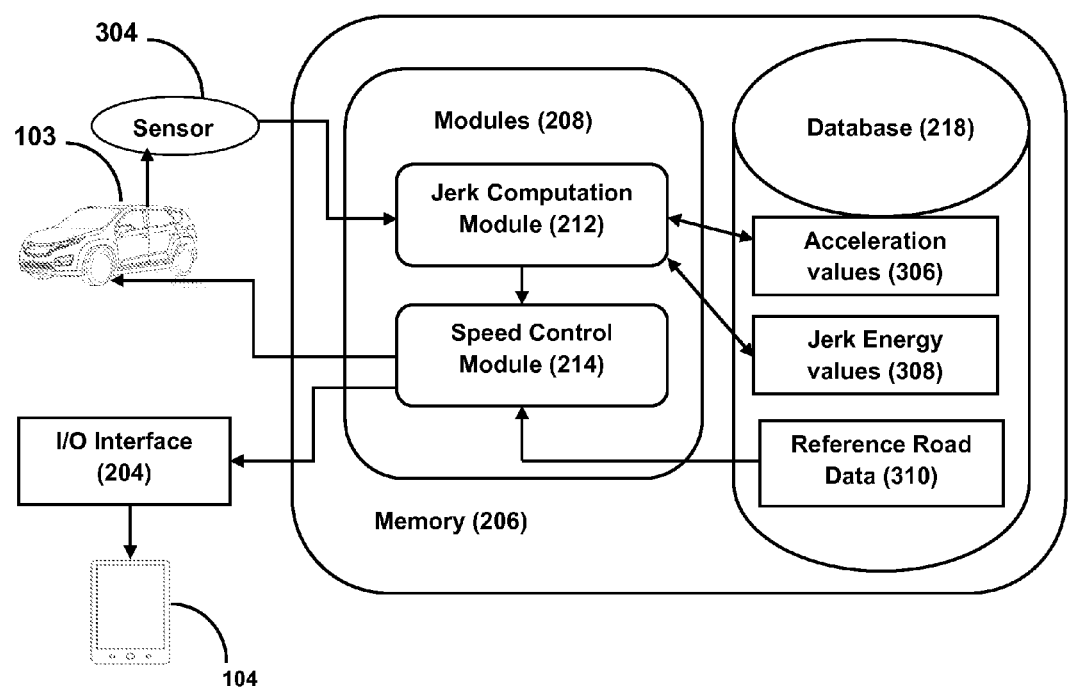
FIG. 3 illustrates various modules and/or components of the system, in accordance with an embodiment of the present disclosure.

In an embodiment, the workings of the jerk computation module 212 along with other components of the system 102 is explained with reference to FIG. 3. As shown in FIG. 3, acceleration of a vehicle 103 may be captured by the jerk computation module 212 via a sensor 304 belonging to the vehicle 103. The sensor 304 may be an accelerometer sensor capable of capturing the acceleration of the vehicle 103 based upon vibration of the vehicle 103 along multiple dimensions. In one embodiment, the sensor 304 may be configured to capture Z-Axis acceleration indicating vertical vibrations of the vehicle 103 on the road.

Figure 4A:
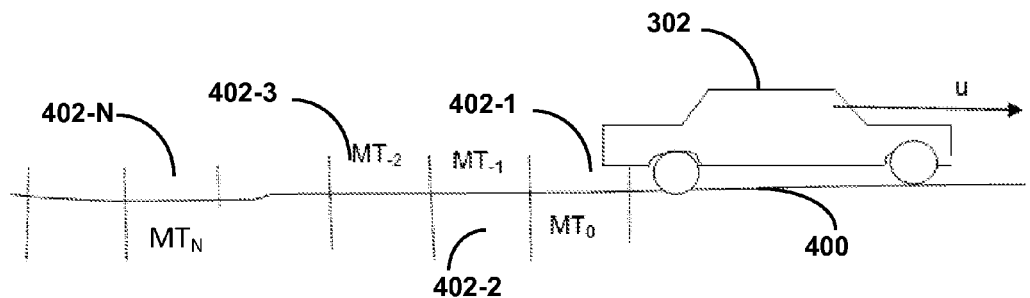
FIG. 4(a) illustrates division of the road into segments, in accordance with an embodiment of the present disclosure.

In one embodiment, the road may be divided into one or more segments, hereinafter referred to as micro-trips (MT). FIG. 4(a) illustrates the division of the road 400 into one or more micro-trips $MT_0$ 402-1, $MT_1$ 402-2, $MT_2$ 402-3, . . . , $MT_N$ 402-N, hereinafter referred to as micro-trips 402. Each micro-trip may be a short segment of the road 400. In one embodiment, each micro-trip may have a time interval of 15 seconds. For each micro-trip, acceleration samples may be captured by the jerk computation module 212. The acceleration samples may be captured at fixed sampling rate. In one embodiment, the acceleration samples may be captured at the frequency of 20 Hz. Consider, for each micro-trip, the acceleration samples $a_1, a_2, a_3, \ldots, a_n$ may be captured at time $t_1, t_2, t_3, \ldots, t_n$, wherein $\Delta t = t_n - t_{n-1}$ for the uniform sampling rate. Acceleration values 306 corresponding to the acceleration samples may be buffered in the database 218.

Subsequent to the capturing of the acceleration values 306, the jerk computation module 212 may be configured to process the acceleration values 306 associated with the acceleration samples of each micro-trip in order to compute jerk energy values 308 for each micro-trip. It is to be understood that a jerk may be indicative of rate of change of acceleration (m/sec$^3$). Therefore, the jerk may be obtained as below:

$$J_i = (a_{i+1} - a_i)/\Delta t \; \forall \; 1 \leq i \leq n-1 \quad (I)$$

In one embodiment, the jerk energy is a form of higher order derivative of acceleration. Therefore, the jerk energy, is obtained by the following formula, $$\text{Jerk energy } JE_S = J_{s1}^2 + J_{s2}^2 + \ldots J_{sN}^2 \quad (II)$$

Wherein, 's' indicates a time window of 1 second according to one embodiment of the present disclosure. Thus, the jerk computation module 212 may compute the jerk energy values 308 based on equations I and II, wherein each jerk energy value is computed by processing the acceleration samples with the time window of 1 second with 50% overlapping. That is, consider a first jerk energy value is obtained by processing first 20 acceleration samples present in a first time window of 1 sec, and then a second jerk energy value may be obtained by processing a $21^{st}$ to $30^{th}$ acceleration samples belonging to a second time window of 1 sec along with $11^{th}$ to $20^{th}$ samples present in the first time window of 1 sec, and thereby processing the acceleration samples with 50% overlapping logic in order to obtain the jerk energy values 308 for each micro-trip. Along with the jerk energy values 308, average speed of the vehicle, and current location of the vehicle 103 may be stored in the database 218.

Subsequent to the computation of the jerk energy values 308, the jerk computation module 212 may be configured to determine the median jerk energy ($JE_R$) of the vehicle 103 on each micro-trip based upon the jerk energy values. It is to be understood that a median of multiple numerical values is a middle numerical value selected from the multiple numerical values by arranging the multiple numerical values in the order of highest value to lowest value or vice-versa. In one example, the median of 25, 35, 100, 45, and 65, when arranged in the order of the lowest value to the highest value or vice-versa will be 45. Similarly, based on the above logic of obtaining the median value, the median jerk energy ($JE_R$) may be determined from the jerk energy values. After the determination of the median jerk energy ($JE_R$), the speed control module 214 may be configured to control the speed of the vehicle as described in detail as below:

Speed Control Module 214

In order to control the speed of the vehicle, initially the speed control module 214 may be configured to compute the predictive median jerk energy ($JE_P$) of the vehicle on each micro-trip. The predictive median jerk energy ($JE_P$) may be computed using a statistical equation such as a regression equation using regression statistical techniques. The regression equation indicates the statistical relationship between the two parameters, namely, average speed and jerk energy. In order to derive the regression equation, the speed control module 214 may process the reference road data 310 stored in the database 218.

Figure 4B:
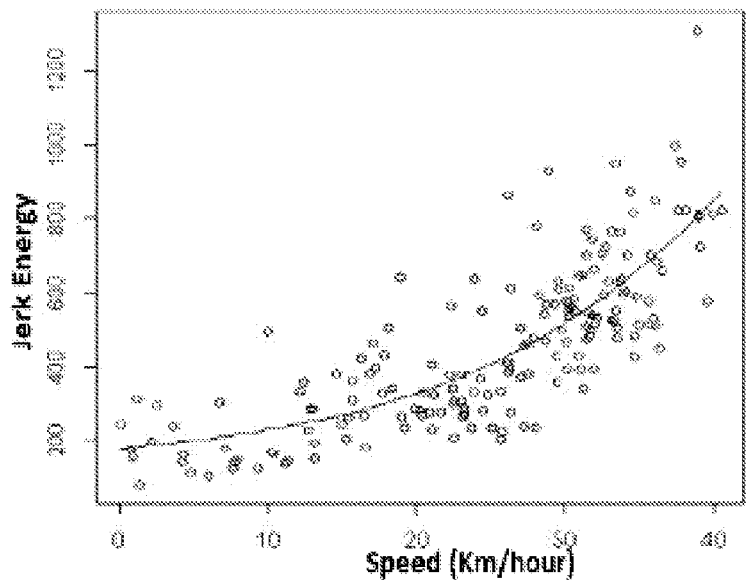
FIG. 4(b) illustrates a scatter plot depicting statistical relationship between speed and jerk energy of the vehicle, in accordance with an embodiment of the present disclosure.

In one embodiment, the reference road data 310 includes test information about the vehicle driven on a reference road or a known track/road (or test track). The reference road data 310 includes reference acceleration samples (reference acceleration data) which may be processed to obtain reference jerk energy values corresponding to vertical vibration (+Z axis) across each reference segment of the reference road. Further, a reference average speed associated with each segment may be included in the reference road data 310. Statistical measures such as the mean, median, and maximum of the reference jerk energy samples may be calculated to get one representation signature in order to pair with the corresponding reference average speed. Thus, the speed control module 214 may derive the parametric relationship between reference median jerk energy and the average speed. Next, using the reference road data 310, a functional relationship between the reference average speed and the reference median jerk energy indicative of the regression equation is derived. FIG. 4(b) is an example scatter plot for reference median jerk energy vs. reference average speed of one micro-trip. The scatter plot includes a fitted curve representing the mathematical relationship between the reference median jerk energy and the reference average speed. In FIG. 4(b), multiple JE values for any small band of speed variation may be observed. Such variation is attributed to different road roughness. The following regression equation is derived based upon the vibration of the vehicle on the reference road.

$$v = a - b*u + c*u^2, \text{ with standard deviation } (\sigma) \quad (III),$$

where the standard deviation ($\sigma$) indicates allowable variance in the measurement.

In one embodiment, 'v' indicates the predicative jerk energy, 'u' indicates the average speed of the vehicle, while coefficients 'a,' 'b,' and 'c' indicate constant numerical values which may vary based upon the nature of the road and the vehicle. In one embodiment, the coefficients 'a,' 'b,' and 'c' may have values of 238.53, 4.42 and 0.56 respectively. Substituting the values of coefficients in equation III, $$v = 238.53 - 4.42*u + 0.56*u^2, \text{ with standard deviation } (\sigma) \quad (IV)$$

It is to be noted that the above constant numerical values of 238.53, 4.42, and 0.56 for the coefficients 'a', 'b,' and 'c' respectively are obtained based on regression analysis performed using the reference road data 310, including the reference acceleration samples (reference acceleration data), the reference jerk energy values, and the reference average speed. Specifically, the reference data 310 included 19 jerk energy (JE) values and one average speed value observed corresponding to the vehicle's journey on the reference track/road for a predefined time interval (for example, the 2 months of April and May). Intuitively, it was suspected that there exists some sort of relationship between the jerk energies and average speeds. The reference data 310 corresponding to the predefined time interval was analyzed by modifying the equations, corresponding to the reference data 310, in order to reduce the intercept terms of the cubic or quadratic (fitted equations corresponding to the reference data 310) regression lines. A scatter plot in form of fitting corresponding to the reference data 310 was obtained, where the X-axis represented speed in km/hr and the Y-axis was median of Jerk energy. The intercept terms were the values of the median jerk energies at x=0, i.e., the median JE when the average speed was NIL, that is, when the vehicle was not moving. Multiple scatter plots in form of fitted curves (like that shown in FIG. 4(b)) were obtained based on datasets corresponding to different days of the months (April and May). Further, trimmed Mean statistics on the set of every coefficients (a, b, and c) were used to obtain the values of the coefficients and hence the equations for the predefined time interval (i.e. two months—April and May) as below: The equation is represented as, $JE = A + B*v + C*v^2 + D*v^3$. Table 1 and Table 2 below show the values of different coefficients in the equation, for known values of 'JE' and 'v' with allowed dispersion ($\sigma^2$), corresponding to datasets pertaining to the months of April and May, respectively.

TABLE 1

| | | Equation | | | | |
|---|---|---|---|---|---|---|
| Days | Fit | A | B | C | D | $\sigma^2$ |
| 9th April | Quadratic | 255.57 | −6.02 | 0.51 | | 130.56 |
| 4th April | Quadratic | 207.11 | −3.81 | 0.48 | | 131.5 |
| 11th April | Quadratic | 229.24 | −7.18 | 0.6 | | 130.61 |
| 30th April | Quadratic | 266.43 | −6.75 | 0.64 | | 178.29 |
| 16th April | Quadratic | 259.64 | −8.69 | 0.67 | | 170.01 |
| 1st April | Linear | 122.24 | 11.36 | | | 110.32 |
| 8th April | Cubic | 151.6 | 21.21 | 1.19 | 0.03 | 136.85 |
| 26th April | Quadratic | 250.81 | −2.68 | 0.45 | | 153.52 |
| 25th April | Quadratic | 209.65 | 3.83 | 0.25 | | 181.15 |
| 29th April | Quadratic | 235.92 | −6.19 | 0.66 | | 185 |
| 18th April | Quadratic | 225.1 | −2.88 | 0.4 | | 144.04 |
| 22nd April | Quadratic | 245.85 | −3.84 | 0.41 | | 128.19 |
| 15th April | Quadratic | 313.79 | −12.86 | 0.74 | | 177.44 |

TABLE 2

| | | Equation | | | | | | |
|---|---|---|---|---|---|---|---|---|
| Days | Fit | A | B | C | D | E | F | $\sigma^2$ |
| 15th May | Quadratic | 162.3 | −9.11 | 1.05 | | | | 130.1 |
| 17th May | Quadratic | 221.85 | −17.97 | 1.46 | | | | 204.16 |
| 23rd May | Quadratic | 236.97 | −19.24 | 1.64 | | | | 267.63 |
| 24th May | Quadratic | 317.4 | −35.58 | 2.28 | | | | 307.94 |
| 16th May | Quadratic | 205.25 | −10.1 | 0.98 | | | | 157.44 |
| 31st May | Quadratic | 245.08 | −7.5 | 0.84 | | | | 173.87 |
| 20th May | Quadratic | 289.2 | −24.99 | 1.58 | | | | 213.43 |
| 22nd May | Quadratic | 277.81 | −18.63 | 1.29 | | | | 202.08 |
| 7th May | Quadratic | 271.04 | −19.01 | 1.24 | | | | 195.04 |
| 14th May | Quadratic | 178.12 | 5.34 | 0.71 | | | | 280.62 |
| 21st May | Quadratic | 137.38 | 7.37 | 0.45 | | | | 215.38 |
| 30th May | Quadratic | 234.17 | 0.06 | 0.58 | | | | 206.56 |
| 27th May | Quadratic | 194.75 | −3.52 | 0.74 | | | | 178.3 |

TABLE 2-continued

| Days | Fit | Equation | | | | | | $\sigma^2$ |
| --- | --- | --- | --- | --- | --- | --- | --- | --- |
| | | A | B | C | D | E | F | |
| $2^{nd}$ May | Fifth order polynomial regression line | 289.7 | −88.51 | 23.46 | −2.09 | 0.08 | 0 | 191.16 |
| $28^{th}$ May | Cubic | 107.98 | 45.85 | −4.01 | 0.12 | | | 152.47 |
| $6^{th}$ May | Quadratic | 241.92 | −9.07 | 0.82 | | | | 170.3 |
| $8^{th}$ May | Quadratic | 210.83 | −0.86 | 0.69 | | | | 229.05 |
| $13^{th}$ May | Quadratic | 318.62 | −22.78 | 1.27 | | | | 183.22 |
| $9^{th}$ May | Cubic | 162.06 | 25.91 | −2.56 | 0.09 | | | 169.57 |
| $29^{th}$ May | Quadratic | 288.54 | −20.78 | 1.35 | | | | 169.25 |
| $3^{rd}$ May | Cubic | 146.64 | 39.07 | −3.01 | 0.08 | | | 168.19 |

From the above tables, the trimmed mean for the coefficients were calculated to obtain regression equations. The linear regression equations corresponding to the two months' datasets were modified, since cubic was not providing improvement and hence second order degree polynomial was taken. The equations obtained using trimmed mean from the above tables are as follows:

$$y = 238.532 - 4.421x + 0.556x^2$$

It was observed that, at x=0, that is when the vehicle was not moving, then also the median jerk energies were coming out be 238.532, 206.979, 226.895, etc., which proves the validity of the approach followed. Hence, the values of coefficients 'a,' 'b,' and 'c' were taken as 238.53, 4.42 and 0.56 respectively for the prediction of median jerk energy even for real time data.

Thus, the speed control module 214 may use the equation III in order to compute the predictive median jerk energy ($JE_P$). After the computation of the predictive median jerk energy ($JE_P$) for each micro-trip, the speed control module 214 may be configured to calculate a score associated with each micro-trip on the road 400. The score may be calculated based upon the median jerk energy ($JE_R$), the predictive median jerk energy ($JE_P$), and the standard deviation ($\sigma$) using following formula:

$$\text{Score} = (JE_R - JE_P)/\sigma \quad (V),$$

wherein the value of '$\sigma$' is 151.1 in accordance with an exemplary embodiment of the present disclosure.

Subsequent to the calculation of the score associated with each micro-trip of the micro-trips 402, the speed control module 214 may be configured to classify each micro-trip into one of a first set of categories and a second set of categories. The first set of categories includes a very bad category and a bad category. The second set of categories includes a very good category, a good category, and an average category. In one embodiment, each micro-trip may be categorized into the very bad category when the score calculated is greater than 1.5. Further, each micro-trip may be categorized into the bad category when the score calculated is greater than 0.5 and less than or equal to 1.5. Further, each micro-trip may be categorized into the average category when the score calculated is greater than or equal to −0.5 and less than or equal to 0.5. Further, each micro-trip may be categorized into the good category when the score calculated is greater than or equal to −1.5 and less than or equal to −0.5. Furthermore, each micro-trip may be categorized into the very good category when the score calculated is less than −1.5.

Based upon the classification of each micro-trip, the speed control module 214 may be configured to transmit a feedback signal to the controller of the vehicle 103. The feedback signal may be indicative of one of reducing, increasing, or retaining the speed of the vehicle 103 on each micro-trip of the road 400 based upon the classification of that micro-trip. In one embodiment, the current speed of the vehicle may be reduced when the current micro-trip or one or more micro-trips preceding the current micro-trip are classified into one of the categories of the first set of categories. Alternatively, the speed of the vehicle may either be retained or increased when the current micro-trip or one or more micro-trips preceding the current micro-trip are classified into one of the categories of the second set of categories.

In an exemplary embodiment, the feedback signal transmitted to the controller is based upon following logic:

| Priority order | Primary Measured Attribute (road classification) | Speed | |
| --- | --- | --- | --- |
| 1st | Very good | Maximum | ↑ |
| 2nd | good | | |
| 3rd | Average | | |
| 4th | bad | | |
| 5th | Very bad | Minimum ↓ | |

As shown in FIG. 3, the user may access each micro-trip, the score assigned to each micro-trip, the classification of each micro-trip, and reduction or increment of the speed of the vehicle through the I/O Interface 204. This is typically useful for fleet managers monitoring the vehicle routes from the remote location. Further, the information generated for the road 400 such as micro-trips, jerk energy values, and/or classification based upon roughness condition may be displayed to the user on the user device 104 via the I/O Interface 204.

Exemplary embodiments discussed above may provide certain advantages. Though not required to practice aspects of the disclosure, these advantages may include those provided by the following features.

Some embodiments of the present disclosure enable controlling speed of an autonomous vehicle based upon roughness of the road.

Some embodiments of the present disclosure enable deriving statistical equation depicting relationship between average speed of the vehicle and the jerk energies of the vehicle, where the relationship is indicative of the roughness of the road.

Some embodiments of the present disclosure enable classifying one or more segments of the road, in terms of roughness, into either a very good category, or a good category, or an average category, or a bad category, or a very bad category.

Some embodiments of the present disclosure enable reducing the speed of the vehicle when one or more segments preceding a current segment or the current segment is classified into the bad category or the very bad category.

Some embodiments of the present disclosure enable either increasing or maintaining the speed of the vehicle when the one or more segments preceding the current segment or the current segment is classified into one of the very good category, the good category, and the average category.

Figure 5:
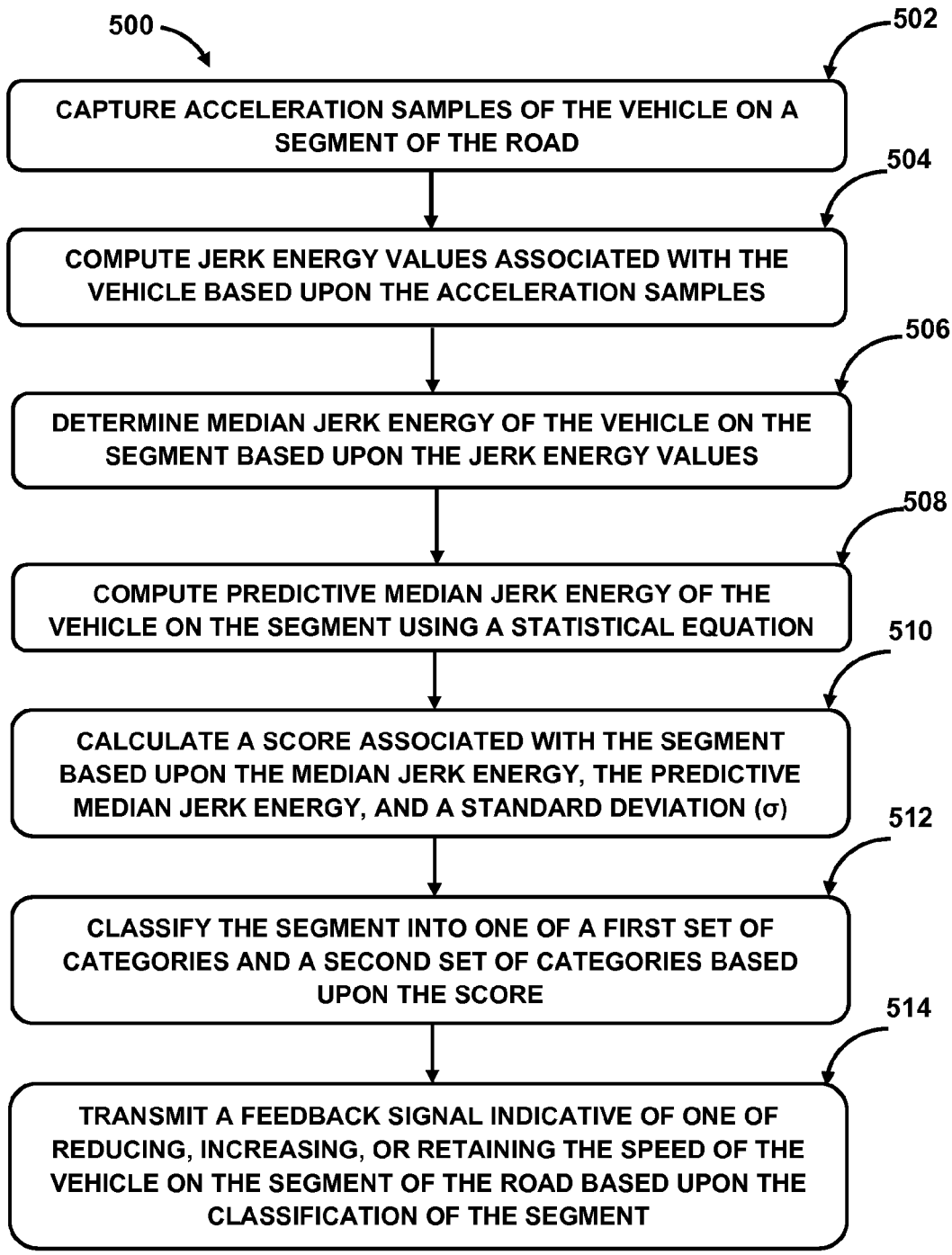
FIG. 5 illustrates a method of controlling a speed of a vehicle on a road, in accordance with an embodiment of the present disclosure.

Referring now to FIG. 5, a method 500 for controlling a speed of a vehicle on a road is shown, in accordance with an embodiment of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the disclosure described herein. Furthermore, the method can be implemented in any suitable hardware, software, firmware, or combination thereof. However, for ease of explanation, in the embodiments described below, the method 500 may be considered to be implemented in the above described system 102.

At block 502, acceleration data comprising acceleration samples of the vehicle on a segment of the road may be captured. In one implementation, the acceleration samples may be captured by the jerk computation module 212 from an acceleration sensor belonging to the vehicle. The acceleration samples may be stored in the database 218.

At block 504, jerk energy values associated with the vehicle may be computed based upon processing of the acceleration samples. In one implementation, the jerk energy values may be computed by the jerk computation module 212. The jerk energy values may be stored in the database 218.

At block 506, median jerk energy of the vehicle on the segment may be determined based upon the jerk energy values. In one implementation, the median jerk energy may be determined by the jerk computation module 212.

At block 508, predictive median jerk energy of the vehicle on the segment may be computed using a statistical equation. The statistical equation may depict predetermined relationship between a reference average speed of the vehicle and reference median jerk energy of the vehicle on reference segments of a reference road. The relationship may be indicative of roughness of each reference segment on the reference road. In one implementation, the predictive median jerk energy may be computed by the speed control module 214.

At block 510, a score associated with the segment may be calculated based upon the median jerk energy, the predictive median jerk energy, and a standard deviation ($\sigma$). In one implementation, the score may be calculated by the speed control module 214.

At block 512, the segment may be classified into one of a first set of categories and a second set of categories based upon the score. In one implementation, the segment may be classified by the speed control module 214.

At block 514, a feedback signal indicative of one of reducing, increasing, or retaining the speed of the vehicle on the segment of the road based upon the classification of the segment may be transmitted to a controller of the vehicle. In one implementation, the feedback signal may be transmitted by the speed control module 214.

Although implementations for methods and systems for controlling a speed of a vehicle on a road have been described in language specific to structural features and/or methods, it is to be understood that the appended claims are not necessarily limited to the specific features or methods described. Rather, the specific features and methods are disclosed as examples of implementations for controlling the speed of the vehicle on the road.

We claim:

1. A method for controlling a speed of a vehicle on a road, the method comprising:
   dividing a road into a plurality of segments;
   providing a vehicle having a controller including a processor and a non-transitory memory;
   capturing, in real time, acceleration data of the vehicle on the road for a segment of the plurality of segments, wherein the acceleration data includes acceleration samples captured on the segment of the plurality of segments;
   computing jerk energy values associated with the vehicle on the segment based upon the acceleration samples;
   determining a median jerk energy of the vehicle on the segment based upon the jerk energy values;
   computing a predictive median jerk energy of the vehicle on the segment using a statistical equation;
   calculating a score associated with the segment based upon the median jerk energy, the predictive median jerk energy, and a standard deviation;
   classifying the segment into one of a first set of categories or a second set of categories based upon the score; and
   transmitting a feedback signal to the controller of the vehicle, wherein the feedback signal is indicative of one of reducing, increasing, or retaining the speed of the vehicle on the segment of the road based upon a classification of the segment into the first or the second set of categories, and wherein the capturing, the computing the jerk energy values, the determining the median jerk energy, the computing the predictive median jerk energy, the calculating the score, the classifying, and the transmitting are performed by the processor using a set of instructions stored in the memory.

2. The method of claim 1, wherein the vehicle includes a sensor, and wherein the acceleration data is captured from the sensor.

3. The method of claim 1, wherein the statistical equation is based on a regression statistical technique, and wherein the statistical equation is, $v = a - b*u + c*u^2$, wherein "v" indicates the predictive median jerk energy, wherein "u" indicates an average speed of the vehicle, and wherein "a," "b," and "c" indicate constant numerical values.

4. The method of claim 3, wherein the statistical equation is obtained by:
   capturing reference acceleration data of the vehicle on a reference road divided into a plurality of reference segments, wherein the reference acceleration data includes reference acceleration samples captured on each of the plurality of reference segments of the reference road;
   determining a reference average speed of the vehicle on each reference segment;

computing reference jerk energy values associated with the vehicle on each reference segment based upon the reference acceleration samples;

determining a reference median jerk energy of the vehicle on each reference segment based upon the jerk energy values;

deriving the statistical equation representing a statistical relationship between the reference median jerk energy and the reference average speed for each segment, wherein the statistical equation is derived based upon the reference median jerk energy, the reference average speed, and the standard deviation, and wherein the statistical equation is a measure of vibration caused to the vehicle on each reference segment depending on the reference median jerk energy value and the reference average speed, and wherein the standard deviation indicates variance in the measure.

5. The method of claim 4, wherein the score is calculated by dividing a difference of the median jerk energy value and the reference median jerk energy value with the standard deviation.

6. The method of claim 1, wherein the segment is classified into the first set of categories when the score is greater than 0.5, and wherein the speed is reduced when the segment is classified into the first set of categories.

7. The method of claim 1, wherein the segment is classified into the second set of categories when the score is less than or equal to 0.5, and wherein the speed is increased or retained when the segment is classified into the second set of categories.

8. The method of claim 1, wherein the reducing, the increasing, or the retaining of the speed of the vehicle on the segment of the road is also based upon the classification of one or more segments of the plurality of segments preceding the segment on the road.

9. A system for controlling a speed of a vehicle on a road, the system comprising:
a processor; and
a non-transitory memory coupled to the processor, wherein the processor is configured for executing a plurality of modules stored in the memory, and wherein the plurality of modules comprises:
a jerk computation module that:
captures, in real time, acceleration data of a vehicle on a road divided into a plurality of segments, wherein the acceleration data comprises acceleration samples captured on a segment of the plurality of segments of the road,
computes jerk energy values associated with the vehicle on the segment based upon the acceleration samples, and
determines a median jerk energy of the vehicle on the segment based upon the jerk energy values; and
a speed control module that:
computes a predictive median jerk energy of the vehicle on the segment using a statistical equation,
calculates a score associated with the segment based upon the median jerk energy, the predictive median jerk energy, and a standard deviation,
classifies the segment into one of a first set of categories or a second set of categories based upon the score, and
transmits a feedback signal to a controller of the vehicle, wherein
the feedback signal is indicative of one of reducing, increasing, or retaining the speed of the vehicle on the segment of the road based upon the classification of the segment into the first or the second set of categories.

10. A non-transitory computer readable medium having embodied thereon a computer program for controlling a speed of a vehicle on a road, the computer program comprising a set of instructions, the set of instructions comprising instructions for:
capturing, in real time, acceleration data of a vehicle on a road divided into a plurality of segments, wherein the acceleration data includes acceleration samples captured on a segment of the plurality of segments of the road;
computing jerk energy values associated with the vehicle on the segment based upon the acceleration samples;
determining a median jerk energy of the vehicle on the segment based upon the jerk energy values;
computing predictive median jerk energy of the vehicle on the segment using a statistical equation;
calculating a score associated with the segment based upon the median jerk energy, the predictive median jerk energy, and a standard deviation;
classifying the segment into one of a first set of categories or a second set of categories based upon the score; and
transmitting a feedback signal to a controller of the vehicle, wherein the feedback signal is indicative of one of reducing, increasing, or retaining the speed of the vehicle on the segment of the road based upon the classification of the segment into the first or the second set of categories.

* * * * *